United States Patent [19]

Asker

[11] 4,398,895
[45] Aug. 16, 1983

[54] WIND PROPULSION DEVICES

[76] Inventor: Gunnar C. F. Asker, 60 E. 42nd St., New York, N.Y. 10017

[21] Appl. No.: 263,366

[22] Filed: May 14, 1981

[51] Int. Cl.$^3$ .......................................... B63H 13/00
[52] U.S. Cl. ...................................................... 440/8
[58] Field of Search ................... 440/8; 114/102, 103, 114/39; 416/4; 244/10, 21, 39, 206

[56] References Cited

U.S. PATENT DOCUMENTS

| | | | |
|---|---|---|---|
| 1,674,169 | 6/1928 | Flettner | 416/4 |
| 2,985,406 | 5/1961 | Bump | 244/10 |

FOREIGN PATENT DOCUMENTS

| | | | |
|---|---|---|---|
| 103660 | 7/1926 | Austria | 416/4 |
| 422974 | 12/1925 | Fed. Rep. of Germany | 114/39 |
| 2430630 | 1/1976 | Fed. Rep. of Germany | 114/102 |

Primary Examiner—Trygve M. Blix
Assistant Examiner—Jesús D. Sotelo
Attorney, Agent, or Firm—Robert E. Isner

[57] ABSTRACT

Wind-assisted power elements comprising paired rotors of which each rotor is independently rotated at a peripheral speed of about 2 to 4 times that of the wind, and the rotors are mounted in tandem pairs in a frame positioned by rotation of the frame on a pivot to the apparent direction of the wind and adjustable for a variable angle of attack, so that the wind will flow in a series over both rotating, generally cylindrical rotor surfaces. The effect is to derive a maximum of forward thrust in the direction of the movement of the ship for propulsion, or when the rotors are driven independently in different directions, a steering or other effect is achieved.

16 Claims, 15 Drawing Figures

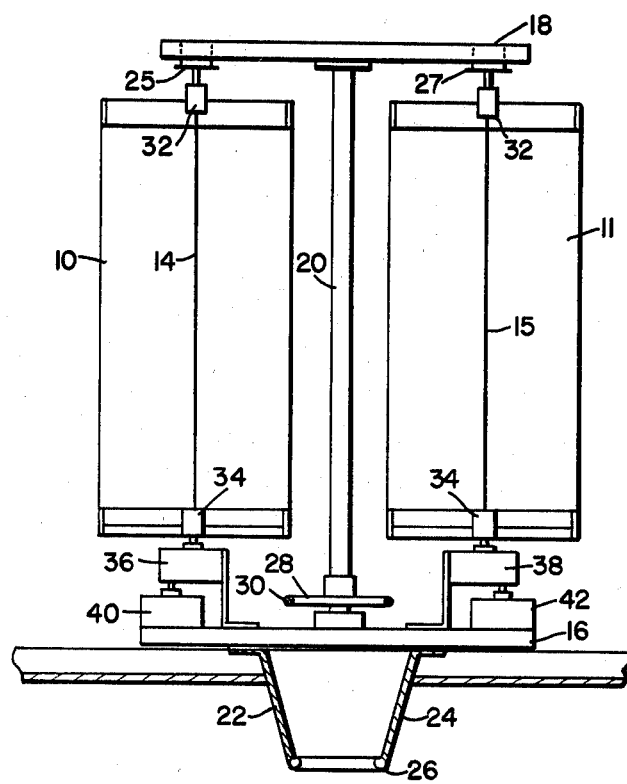
Fig.1
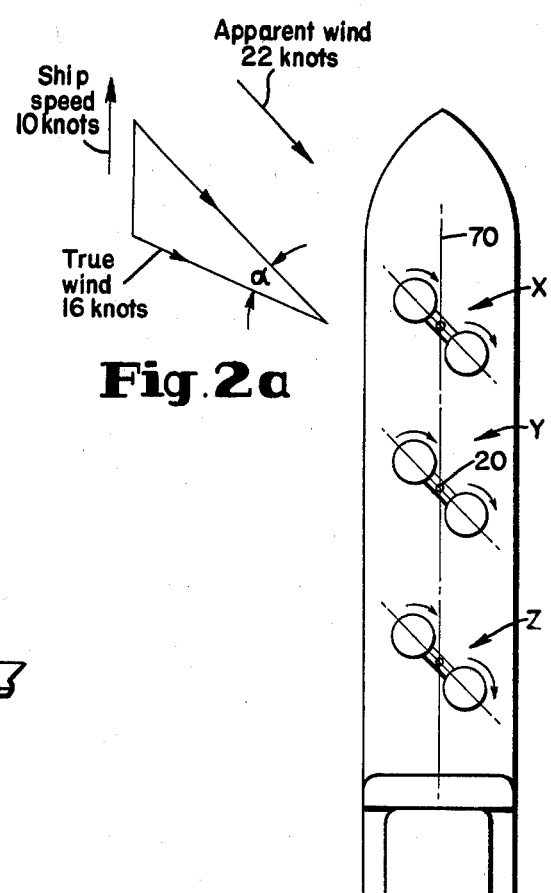
Fig.2a
Fig.2
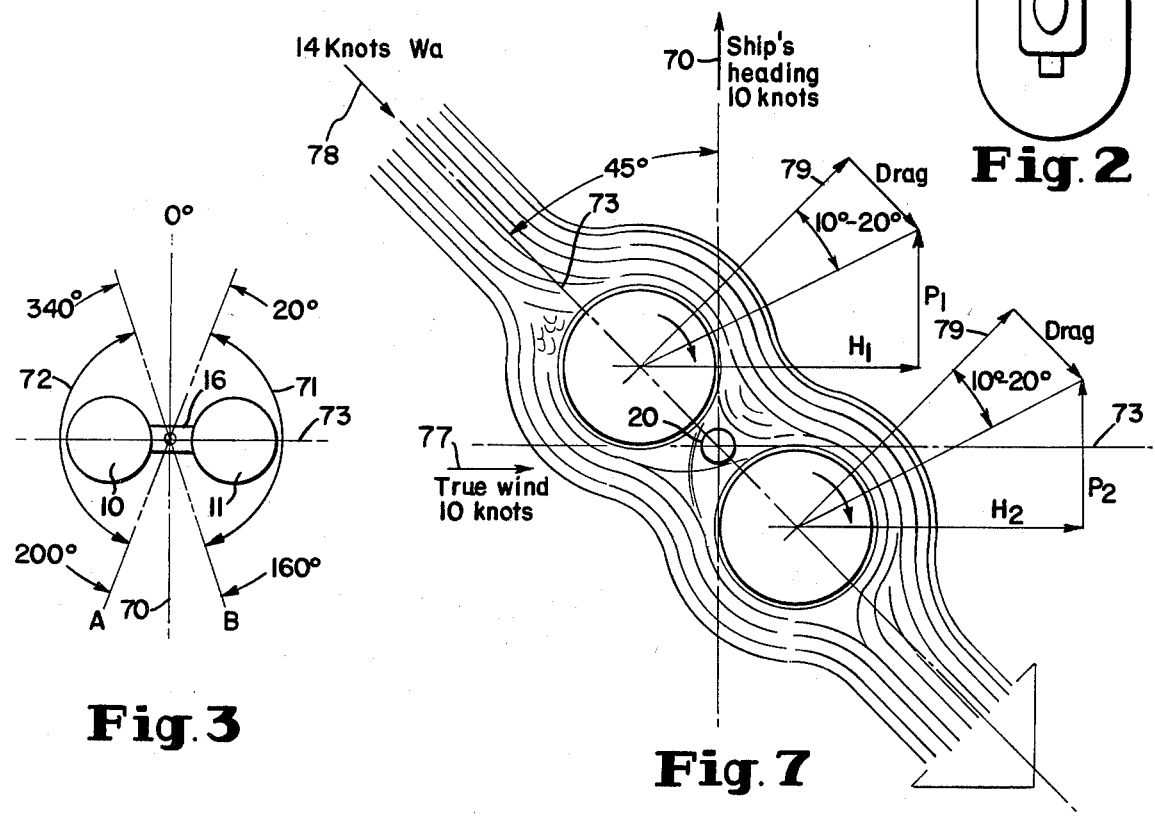
Fig.3
Fig.7

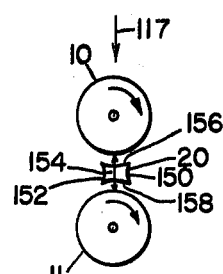
Fig.11
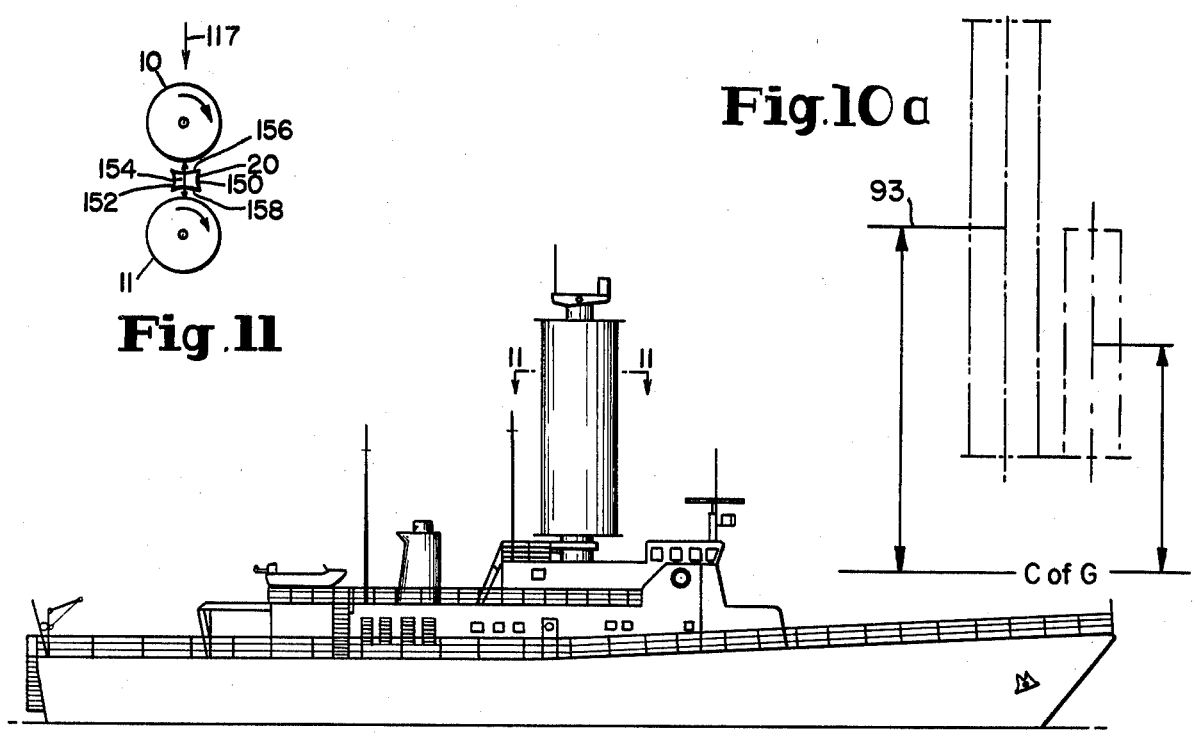
Fig.10a
Fig.10
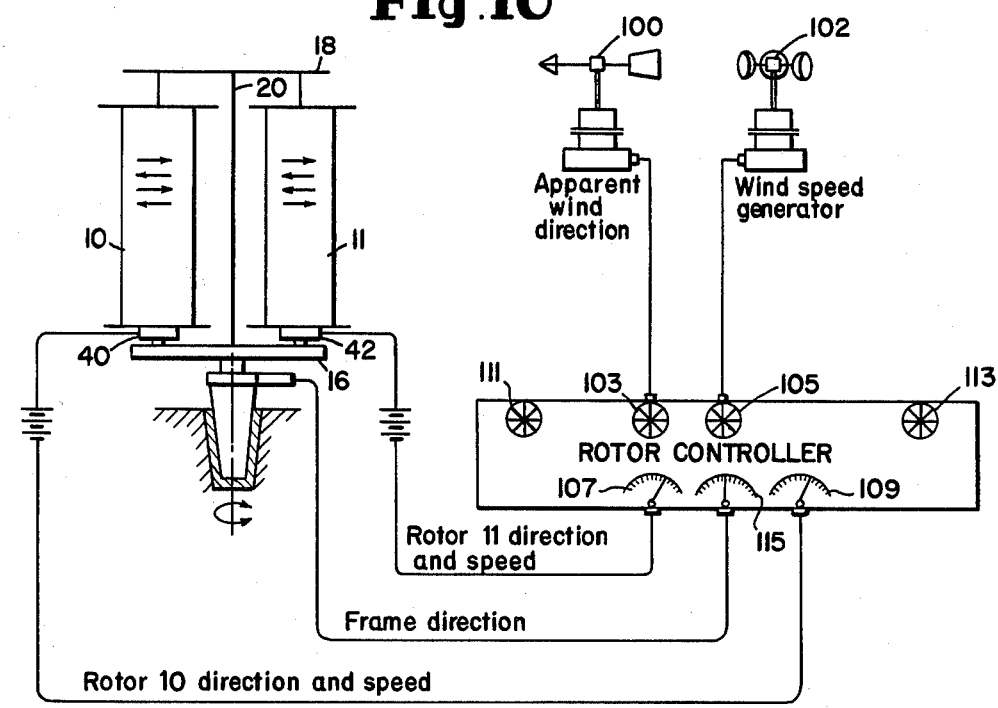
Fig.12
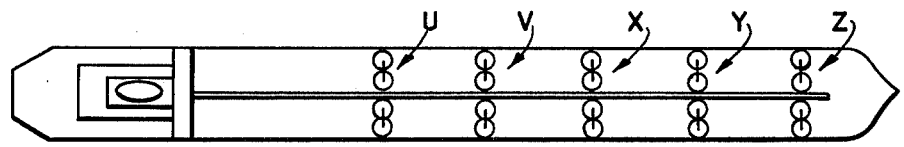
Fig.13

WIND PROPULSION DEVICES

This invention relates to wind-assisted power elements for ship propulsion, and to the mounting of vertically supported wind exposed rotary arcuate surfaces, each supported in pairs, each of the rotors being rotatable about a vertically supported rotor axis in a pivotally mounted supporting frame, the frame being directionally rotated for positioning the paired rotors to approximate the apparent wind direction for acceleration of wind velocity ahead of the rotating surfaces. The rotors are driven by electrical or hydraulic means to rotate both rotors of a close-spaced pair in the same or opposite, clockwise or counter clockwise, directions to provide ship propulsion power from the wind, or to provide a steering effect or a reversing effect when the paired rotors are moved in direction relatively opposite one to the other.

This invention is an improvement upon windpowered sailing means described by Flettner 1674169, June 1928, who describes separate rotatable elements having arcuate surfaces such as cylinders each mounted independently to be rotated upon a vertically supported axis. He also shows how sheet-like sail means may be entrained about the cylindrical surfaces of each Flettner rotor, with the moving sail surface held by a wind vane to be exposed upon each sail side in the direction of the prevailing wind current. A lower air pressure is developed on the side of the sail moving in the wind direction with a higher pressure on the side moving against the wind stream, thus to develop a power thrust substantially at right angles to the direction of the wind current.

The Flettner device obtains energy from the wind flow in what he describes as the "Magnus Effect" deriving a transverse propulsion effect to move the ship in the direction of its axis. According to his structure the sail of Flettner only derives a small resultant portion of the power available from the wind. An important effect is a tendency of the resultant wind power thrust developed in the sail to cause the ship to heel laterally as it moves. The present invention is a substantial improvement upon Flettner in using rotatable elements in pairs without sail sheets and directable as pairs to face into the apparent direction of the wind for optimum wind power transfer with reduced heeling. This is made possible by a unique air sealing method to prevent pressure equalization between the opposing sides of low and high pressure.

The power developed from the wind upon a rotating surface, which Flettner called the Magnus Effect, is more correctly an application of the Bernoulli theorem. Bernoulli showed that the sum of static pressure and velocity pressure of any gas is constant for a given elevation. Applied to the effect of an air stream upon rotors, this amounts to reducing the pressure upon the rotor surface portion where the wind stream encounters the boundary layer of air of the rotating surface both moving in the same direction to cause an increase in velocity, and increasing the pressure while decreasing the velocity on the opposite rotor surface where the boundary layer is disrupted by the opposite flowing wind stream to create a surface turbulence.

The mounting, according to the present invention, of several rotors such as a pair of close-spaced rotors to intercept and divide the same wind stream to flow in part over one rotor surface of the pair and then directly over the other, in effect will intercept the boundary layer of air of both rotors for a surface area dimension longer than the combined diameters of the pair of rotating surfaces, thereby extending the length of the low pressure area obtained from high velocity air. Total wind exposed arc of twin rotors is therefore more than twice that of a single rotor of twice the height.

In the Flettner design, the power derived from the wind is proportional to the rotating surface of a single rotor or sail area exposed to the wind stream, so that it is necesary for Flettner, in order to provide sufficient surface area, to use an increasingly tall rotor for improving wind power efficiency. By the present use of a pair of rotors, for example, one half of the rotor height of that used by Flettner of about equal diameters, the pair of rotors having at least about the same surface area exposed to the wind stream as Flettner's single rotor, the amount of power available from two rotors with about the same surface exposure, is the same or more than for the single rotor having double rotor height. Moreover, with the taller rotor of Flettner, the center of sail pressure of the ship is correspondingly raised to increase the heeling moment developed by the wind. The pair of rotors hereof of about the same surface area exposed to the wind stream also has reduced heeling.

Finally, applicant's use of paired rotors operated as oppositely rotating pairs become useful in a following wind or for steering if needed. The counter current rotation, as tests have indicated, is also of importance in tacking, that is shifting the wind from starboard to port or vice versa when preceeding against the wind.

According to the present invention, the tandem pair of rotors will be maintained in a frame positioned to the apparent direction of the wind, the resultant of the ship movement and wind direction. If the rotation of both rotors is reversed the power will be transmitted to the rear. In a tailwind both rotors, each rotated opposite to the other, will offset any tendency for the ship to heel by the angular pressure developed. The invention is further described with reference to the drawings wherein:

FIG. 1 is a diagrammatic elevation of a pair of rotors in a frame with rotary driving motors and a rotary pivot for the frame;

FIG. 2 is a plan view of a large ship with several paired rotors supported upon angularly rotatable frames to illustrate their mounting;

FIG. 2(a) is a vector diagram of resultant force effect of wind and ship movements;

FIG. 3 is a diagram illustrating the rotary angles of paired rotors and rotatable frame;

FIG. 7 is a diagram illustrating positioning of frame and twin rotors into the apparent wind direction;

Figure 8:
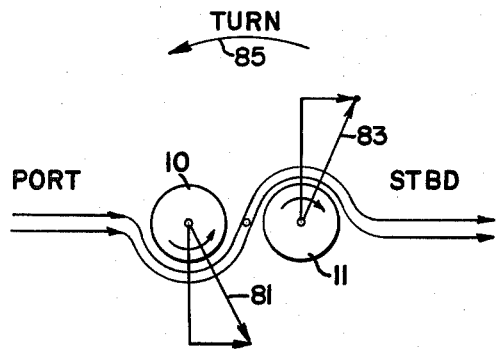
Figure 9:
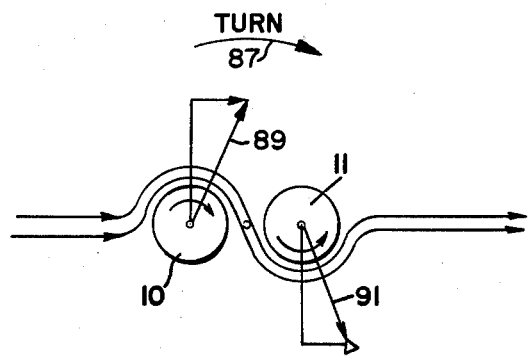

FIG. 8 diagrammatically illustrates turning to port with rotors moving in opposite direction;

FIG. 9 diagrammatically illustrates turning to starboard with the rotors now reversed in direction to that shown in FIG. 8;

FIG. 10 compares the height of rotors of a small boat with twin rotors compared to the height of a single Flettner rotor shown in FIG. 10a;

FIG. 11 illustrates spacing of a pair of rotors about a central frame mast;

FIG. 12 diagrammatically illustrates wind speed and direction, controlling of rotors and frame position; and FIG. 13 is a larger boat than that of FIG. 2 illustrating placement of balanced pairs of rotors on each ship axis side.

Referring first to FIG. 1, each twin pair of rotors of the present invention comprises a first, usually port side, rotor 10 and a starboard side rotor 11. Each rotor is respectively mounted for rotation upon vertical driving and pivot shafts 14 and 15. The rotors and their driving shafts may be pivotally supported for rotation between lower frame member 16 and an upper frame member 18. Both the upper and lower frame members 16 and 18 are each fixed to a central pivotally mounted shaft 20 forming a central mast for angular directional movement therewith to position the frame and rotors therein with respect to the wind. The lower end of shaft 20 is supported for rotation in a rotary drive and support member 22 mounted for rotation of the total frame in a housing 24 upon bearing elements 26 for support and angular positioning of the frame by rotation of shaft 20 and frame elements, upper and lower beams 18 and 16, and rotors 10 and 11 supported between beams.

A pulley wheel 28 with single or multiple grooves or a gear-reducer is fastened to the shaft 20 and is adapted to have entrained thereabout driving belt 30 connected to a servo means (not shown) which will rotate the pulley, frame and rotors therein, angularly in an arc of up to about 140 degrees, from a frame position A to a frame position B for positioning the total frame and rotors supported therein to the apparent wind direction, according to the diagrams of FIGS. 3, 7 and 12.

As shown in FIG. 3, for small boats, the frame beams 16 and 18 pivotally fixed at the ship axis 70 will be rotatable to move arcuately in the patterns shown by arrows 71 and 72. For frame position A, its starboard rotor 11 may be positioned 20° from the ship axis 70 and its port rotor 10 at 200° from the ship axis. Each rotor in the frame may be arcuately moved to position B where the port rotor 10 is 340° and starboard rotor 11 is then 160° from axis 70, whereby a total angular movement of 140° is possible. Thus the rotors and frame are never parallel to the longitudinal ship axis 70 but vary this 140 degrees position distance moved arcuately above and below the horizontal axis 73 for each rotor as shown by arrows 71 and 72.

As shown in FIG. 1, upper frame member 18 has bearing members 25 and 27 in which are respectively supported rotor axis shafts 15 and 14 which pass through the upper rotor end but are fastened to rotate fixed the member sleeve 32 and rotor above, and similarly, sleeve member 34 below, each shaft being turned for rotary drive and support of each rotor. The lower end of a pivot shaft 14 is fastened for rotary driving engagement with the cylindrical rotor 10 whereby the shaft 14 will be rotated and support the rotor 10 for rotation cooperatively with the upper pivot 27 of frame 18. Similarly the shaft 15 is fastened to, and also pass through, sleeves 32 and 34, at upper and lower ends to drive, and support the rotor 11, with its upper end pivotally supported in bearing 25 in beam 18. The lower ends of the pivot shafts 14 and 15 each respectively enter gear reducing drives 36 and 38 which in turn connect to driving motors 40 and 42 each for independent directional and speed controlled drive of the rotors 10 and 11. The motors are geared to rotate the rotors with a peripheral speed of some 2 to 4 times the wind velocity and controlled by electrical rheostats as shown in FIG. 12 and reviewed further below.

Again, the servo positioning of the supporting frame on its pivot with respect to the wind as well as control of the rotor speeds may be done manually, automatically or by remote control to control both the rotor speeds, their rotational direction as well as the position of the frame as shown in FIG. 12.

Figure 4:
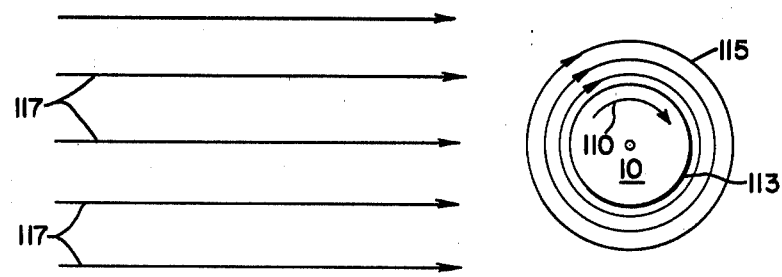
FIG. 4 is a rotational diagram in plan of a single rotor.

As shown in FIG. 4, a rotating cylindrical body 10 in the direction of the arrow 110 will carry with it a boundary film layer of air 115 rotating in the same direction and with a resultant velocity close to its surfaces and decreasing outward from the range stated of 4-2. The surrounding air stream speed conversely will range from about ¼th to ½ that of the peripheral speed of the cylindrical surface 113.

Figure 5:
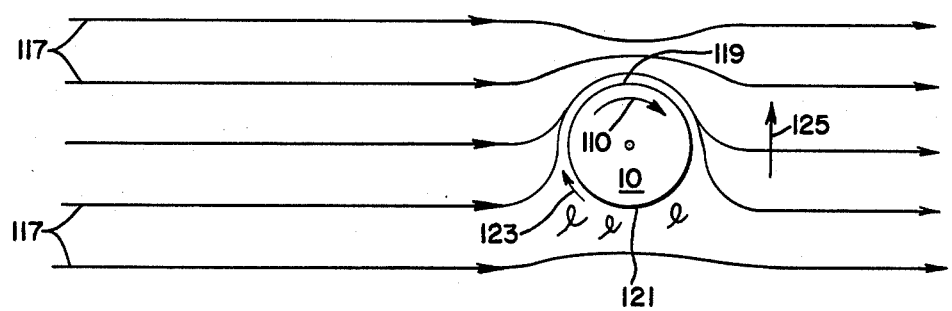
FIG. 5 shows the wind flow pattern over a single rotor.

For a single cylindrical rotor, as shown in FIG. 5, and with the wind current traveling in the direction shown by the arrows 117, the wind impinges upon the surfaces of the rotating cylinder 10 as it enters the region of the boundary air layer 115. The air flow thereover in direction of rotor rotation shown by arrow 110, will be increased in velocity in contact with the more rapidly rotating peripheral rotor surface, and consequently the boundary air will be reduced in pressure at the peripheral surface area and direction 119. That is, the wind stream will have reduced its pressure by increased velocity flow in the same direction in contact with the peripheral surface 119 moving in the same direction as the rotating cylinder 10. The boundary air layer and the wind current 117, passing in the same direction, increases the wind velocity at that point 119 and result in a reduced air pressure. The boundary layer air stream 115 at the opposite rotating cylinder side 121 moving in a reverse direction with respect to the wind direction 117 will cause a turbulence at the point 123 in that opposite boundary air layer area 121. At that opposite point 121 of the rotating cylinder surface, the air pressure upon the rotor surface increases somewhat, but not as much as the pressure is reduced at 119. The force of the wind stream 117 upon the rotor is a decrease in air pressure at the one side 119 of the rotating cylinder and an increase in pressure at 121 with a resultant force developed by both high and low pressures acting together upon opposite peripheral sides of the rotor in the direction shown by the arrow 125.

Figure 6:
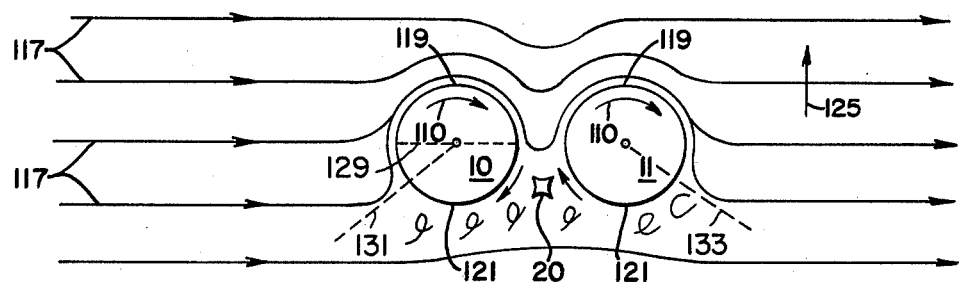
FIG. 6 shows an airflow pattern over the surfaces of twin rotors.

As shown in FIG. 6, the air current 117 is caused, according to the present invention, to pass over the peripheral surfaces of a pair of rotating cylinders 10 and 11 rotating in the same direction shown by the arrows 110. These rotors are mounted sufficiently close together in the frame so that the air stream will pass directly from one rotor 10 surface to the neighboring rotor 11 surface. That spacing between rotors is less than several diameters of a rotor, but not so close as to allow substantial turbulence to develop between oppositely moving boundary layer air streams. It will be noted from the air stream diagram not only that reduced pressure areas are similarly developed on the rotor surfaces area 119 with increased pressures on the opposite disposed rotor surfaces area 121. Part of the wind stream flow becomes converted to part of the boundary layer flow forming a combined reduced pressure area in the air stream flowing past over the surface areas 119 of both cylinders, but that combined reduced pressure is less than would be available by either of the reduced pressure points of the rotating cylinders because they are mounted cooperatively in tandem and close-spaced to receive the air stream flow in combination, as shown on the opposite 121 of both cooperating rotating cylinders. Moreover, it will be noted that the air stream 117 impinging on the rotor surface 119 intercepts the air stream at a substantial angle below its dotted line diameter 129, such as at about the dotted angle line 131, but is carried with the lower pressure, boundary layer well past the opposite diameter end to about the angle dotted line 133 whereby each rotor 10 and 11 carries a low pressure side 119 boundary layer well beyond its geometric 180° surface exposure such as well over 210° of surface exposure with the low pressure for both rotors.

The air pressure is also built up behind the rotors because of friction between the opposing air stream. The resultant force of the combined rotating cylinders in the direction shown by the arrow 125 is more than twice that available from a single cylinder. That result is available when the cylinders are close-mounted as a pair to intercept the air stream on their surfaces close enough to each other whereby both are affected by the same air stream passing over both in tandem to receive the same modified air stream flow in a series. Such distance between rotors may vary, usually less than several rotor diameters such as sufficient to allow space therebetween for mast 20, which is strong enough to support the beams 16 and 18 as well as rotors in the frame. That mast may be sized from about 1 to 2 inches needed to support the rotors and frame up to the actual diameter of a rotor or somewhat more. In any case the mast will be spaced away from a rotor surface to avoid substantial interference with boundary layer air flow, yet spaced close enough to provide an efficient air seal between rotor and mast.

An important reason that the pair of lower height rotors are more efficient is that the normal boundary air flow velocities between the rotors, with the selected spacing, indicated, becomes high enough to effectively seal the low pressure area in front of the rotors from the high pressure area behind them. This also tends to prevent pressure dilution from the surrounding air both from side to side as well as between front to rear of the rotors.

As shown in FIG. 11, the mast 20 is shaped for streamlining the air flow across the rotor surfaces on opposite sides 119 and 121 so that one streamlined mast surface 150 toward the bow in forward motion would have reduced pressure and the other opposite streamlined mast surface 152 would have increased pressure from the stern. The arrow 154, represents the separating distance between rotors 10 and 11. The mast 20 will also have opposite curved streamline surfaces 156 and 158 each spaced a distance away from the rotors 10 and 11 sufficient to avoid significant interference of the mast surfaces with the boundary layers of air passing with the rotation of rotors, the opposite streamline surfaces 156 and 158 disposed close enough to the surfaces of rotors 10 and 11 to avoid significant interference with the boundary layers of air moving therewith. In this manner the mast is shaped to operate as a seal between rotors and provides streamline curvature for cooperation with the air flow over both sides as well as boundary layer air neighboring both rotors.

The positioning of the pair of rotors to face the apparent wind, which is a result of true wind speed and ship speed is explained in FIG. 7. The longitudinal axis of the ship 70 and the right angle, an athwart-ship or beam of the ship axis 73, are here illustrated with respect to the true and apparent wind directions. The frame pivot for the vertical supporting mast thereof 20, is centrally positioned in the ship as shown. Assuming a true wind direction moving from the port to the starboard side that is, from the west, as indicated by the arrow 77 parallel to the beam 73 and the ship movement direction is North according to the arrow and axis 70 and the ships speed is 10 knots, the true wind velocity being also 10 knots, then the apparent wind speed, a resultant of the true wind and ship speed becomes 14 knots shown as Wa from the northwest, the direction of arrow 78 passing over the position of the rotors, which consequently is placed as shown directly into the apparent wind direction Wa. The actual positioning of the rotor pair is facing northwest, so that the direction in which is expends its motor power is illustrated by the arrows 79. Thus the propulsion force is at an angle of 45° to the northeast. At this apparent wind speed the rotors are maintained at an approximate peripheral speed of 4 times the wind speed or 56 knots. If the apparent wind speed were to increase to 25 knots with this constant rotor speed, then the multiple of wind speed to rotors speed may drop from 4 to 2, the power to be derived from the wind increasing with the square of the wind velocity, the lift from the rotors being reduced with a lower wind-rotor speed ratio, and thus the system is self-reefing with the same rotor surface exposure.

Again, it will be apparent that in heavy weather, the rotors usually having an exposure at some ⅛th that of ordinary sails for propelling a craft of the same size by wind, inherently will have a great self-reefing safety factor. A further flexibility in heavy weather is available in the twin rotors to reduce the speed by their speed control with a consequent wind resistance of less than bare masts in a sailing vessel with conventional rig.

It is further noted that the speed of the rotors is controlled to a range of from about 4 to 2 that of the apparent wind for improved efficiency to derive motive power therefrom. At a higher peripheral speed ratio the power derived from the wind speed is not substantially increased, and at much lower ratios the power derived from the wind is not significant. Again, for this example it will be noted that where the wind is in an opposite direction such as flowing from the east, the direction of the rotors will be reversed. Hence, as shown in FIG. 7, with the wind flowing from the west the direction of the rotors is closkwise for the reduced pressure side, the same as the apparent wind direction and is also clockwise for the increased pressure side but countercurrent to the apparent wind direction. This is, for this example, with the true wind from the west, the apparent wind from the northwest, and the craft moving north, the rotors will be turned clockwise, and if the ship were moving in opposite direction or if the wind were derived from the opposite eastern direction, the rotors then would be turned counterclockwise. The apparent wind direction so reversed and flowing from the northeast would then have the reversed rotor direction condition.

In turning the ship, to the port direction, the direction of arrow 85 as shown in FIG. 8 with the apparent wind from the port side, the rotor 10 is rotated counterclockwise and the rotor 11 clockwise, whereby the resultant force direction of rotor 10 is SSE according to the resultant arrow 81 and the force direction of rotor 11 will be as shown by arrow 83 whereby the combined turning forces are then to the NNE direction. For reversed turning shown in FIG. 9 direction, the resultant forces are opposite, developed by the reversed rotation of the rotors 10 and 11, the rotor 10 then being turned clockwise and the rotor 11 counterclockwise, with resultant forces illustrated respectively by resultant arrow 89 for the clockwise rotating rotor 10 and by arrow 91 for counterclockwise rotor 11 with the consequent turning force upon the ship being to the starboard direction shown by arrow 87.

For a small ship as shown in FIG. 10, the twin rotors are mounted as shown each on either side of the ship axis and at the center line of the craft. With a direct headwind or direct tailwind, the rotors may be directly placed parallel to the beam of the ship but are rotated in opposite directions. With the rotor 10 turning clockwise and the rotor 11 counterclockwise as shown in FIG. 11, the ship will slowly reverse its direction in a headwind. In a tailwind with the rotors moving in opposite direction, the ship will be propelled forward.

For a small ship as shown in FIG. 10, the twin rotors are mounted midships as shown. For larger ships three or more twin rotors may be mounted with their frame pivots directly on the longitudinal axis of the ship each disposed as shown. It is possible also as shown in FIG. 13 to mount a set of twin rotors balanced at each side of the longitudinal axis so that there are at least two paired rotors one pair at each side of the longitudinal axis and such sets of rotors are disposed in balance sets along the longitudinal axis one pair at least on each side. For that type of modification it will be observed that all of the rotors on both sides of the longitudinal axis are spaced and numbered to provide a balanced disposition of power.

As shown in FIG. 10A, for purposes of comparison of rotor heights, a single sail rotor as needed by Flettner is illustrated at a comparative height to that of the twin rotor system hereof. The diagrammatic guideline 93 illustrates how the center of sail pressure of the taller rotor is raised such as to about double that of the twin rotors, and thus, even of the same rotor diameters raises the center of the ship for the same surface area exposure. This causes the heeling effect of Flettner, in his fore and aft disposition of a sail, to become larger. Consequently, the heeling moment is increased because the heeling arw, being the distance between the center of the ships lateral plane and the center of the sail pressure, is longer.

For optimum derivation of energy from the wind, the frame and rotors therein of each pair is placed in a direction that is steeper, actually about the sine of the angle alpha shown in FIG. 2a, the true wind direction modified by the ship speed as shown in the diagram. The ship's speed may be the result of wind energy alone or a combination of wind and engine power when available. Thus the ship may derive power from the wind as well as engines turning one or more propellors, depending on type of vessel.

Referring to FIG. 12, the true direction of the wind modified by the ship speed will be indicated by the wind vane 100, the exact angle of which is transmitted to and shown on a recording dial 103 visible to the helmsman who can read the apparent wind direction as he steers and will set the position of the rotors, with or without an angle of attack from the apparent wind direction as indicated by the dial (103). The wind speed measured by the generator 102 is also indicated on a dial 105. The peripheral speed of each of the rotors 10 and 11 are respectively controlled by rheostats 107 and 109 adjusted by the helmsman who will adjust the speed by rhoestat control of the current flowing to the driving motors for each rotor, indicated respectively as rotor speed indicators 111 and 113. The direction thus is fixed to correspond to the apparent wind direction and the rotor speed is set to the range of 4 to 2 times the preferred ratio of peripheral rotor velocity to the wind speed. In this manner the speed of rotors and the position of the direction of wind will be correlated by the helmsman reading the data and manually positioning the frame supporting the rotors with respect to the apparent wind.

Thus, referring to FIG. 3, where the placement line A is 20° above and 200° below the axis 70 of the ship, the true wind direction will be some 25° less than this, that is, from 30° to 65° from the starboard side for the upper starboard rotor and 210° to 255° for the lower port rotor. There is similar arcuate movement available for the placement B of FIG. 3 in which the port rotor is at 340° and the starboard rotor at 160° with respect to the axis of the ship 70.

As shown in FIG. 2, for a larger ship, several pairs of rotors X, Y, and Z may be mounted in a row upon the ship's axis as shown. Where the ship is much larger again than this, and for optimum wind power thrust as shown in FIG. 13, the paired rotors do not need to be mounted directly upon the ship axis but can be disposed as an equal number of correspondingly spaced pairs, such as two pairs M and N, each equally spaced on either side of the ship axis. For balance all in the row are disposed upon the same beam line to achieve the same energy thrust from the wind passing from whatever direction. Several such pairs in U, V, X, Y and Z can be used, again depending on the size of the ship. As shown, five rows of equally balanced pairs on opposite sides of the ship's axis may be placed, all balanced, for equal thrust from the same wind. In general, all of the rotors and their placement direction with respect to the wind for the many pairs will be the same.

In usual operation where a ship is equipped both with motor power and with rotor sails deriving energy from the wind, there is substantial fuel saving where the wind is good using the engines only where the wind is low or too high for practical derivation of wind power therefrom. Again, where the wind is good, optimum use of the wind may be made with both wind and rotor power used to their best combination. Thus the wind power may be relied on alone for propulsion or in combination with engines with very substantial savings of the fuel.

Certain modifications will occur to those skilled in the art. It is intended here only to describe the invention in its usual practice. It is preferred to use cylindrically shaped rotors, and of a dimmeter as large as consistent with the ship size and auxiliary equipment. The rotors may be of other annular design such as with indented channels to prevent vertical deflection along the rotors surfaces and may have airfoil shaped and plates to reduce pressure dilution at the ends top and bottom.

While as stated the rotor speed, achieved by selection of gearing connecting to a rotor drive for each rotor to drive the rotor with a peripheral speed of about four times that of the wind velocity, and preferably in the range of 4 to 2 times, a greater peripheral surface speed of the rotor will not achieve a substantially greater energy transfer from the wind, and a lower speed may reduce the energy derivation from the wind. The engine power for driving the rotors will be variable with the size of craft. They may be internal combustion engines or electric motors operated either from a motor driven generator or batteries to supply the needed current to drive the electric motors. Such motor may also be driven by a wind turbine directly connected through said gearing to drive the rotors or a windpower driven turbine may be used for electric generation which in turn will supply the current for driving the rotor motors.

Accordingly it is intended that the description herein will be regarded as exemplary and not limiting except as defined in the claims.

I claim:

1. Windpower converting propulsion apparatus for a vessel having a fore-aft centerline comprising
  a pair of rotatably mounted elongate vertical cylindrical rotors having their longitudinal axes disposed parallel to each other and their peripheral surfaces in closely spaced relation,
  means for codirectionally rotating said rotors about their respective longitudinal axes at a controlled peripheral speed of at least two times the apparent wind velocity, and
  means for conjointly rotatably displacing said pair of rotors relative to the fore-aft centerline of the vessel to permit the selective positioning thereof at a preselected angle of attack relative to the apparent wind direction to permit the wind to pass over the exposed surfaces of said pair of rotors in series and substantially co-directionally with the boundary layer air flow induced by said rotor rotation on one side thereof to decrease the effective pressure thereat.

2. Windpower converting vessel propulsion apparatus as set forth in claim 1 wherein said last mentioned means are operable independent of apparent wind direction for positioning said pair of rotors at a selectable angle of attack relative to said apparent wind direction varying from 0° to ±30°.

3. Windpower converting vessel propulsion apparatus as set forth in claim 1 further including
  pivotally mounted frame means for supporting said pair of rotors in vertical parallel spaced relation and
  wherein said conjoint rotor displacing means includes means for rotatably displacing said frame means through an arc of about 140° relative to the fore-aft centerline of the vessel to effect selective positioning of said frame supported rotors relative to the apparent wind direction for forward vessel propulsion.

4. Windpower converting vessel propulsion apparatus as set forth in claim 1 wherein said codirectional rotor rotating means is adapted to drive both said rotors clockwise when the wind is from the port side and to drive both said rotors counter-clockwise when the wind is from the starboard side relative to the fore-aft centerline of said vessel.

5. Windpower converting vessel propulsion apparatus as set forth in claim 1 wherein said controlled speed of said rotors is in the range of 2 to 4 times the apparent wind velocity.

6. Windpower converting vessel propulsion apparatus as set forth in claim 1 wherein the peripheral surfaces of the cylindrical rotors are spaced less than one rotor diameter apart at the point of closest approach therebetween.

7. Windpower converting vessel propulsion means as set forth in claim 1 including
  spacer means disposed intermediate the peripheral surfaces of said rotors at the point of closest approach thereof for isolating the area of increased pressure on one side of said rotors from the area of reduced pressure on the other side thereof without substantial disruption of the boundary layer air stream flow adjacent said peripheral surfaces of said rotors induced by rotation thereof.

8. The windpower energy converting means as set forth in claim 7 wherein said spacer means mounted between a pair of rotors has its surface adjacent to each rotor arcuately shaped to reduce turbulence of the boundary layer air carried by each rotor.

9. The windpower energy converting means as set forth in claim 7 wherein said spacer means mounted between rotors has its surfaces at the front and rear streamlined to allow smooth wind flow from one rotor surface to the companion rotor surface.

10. The windpower converting propulsion means as set forth in claim 7 wherein said spacer means between said rotors is a mast-like support element having transversely extending rotor supporting frame elements mounted thereon.

11. The windpower energy converting propulsion means as set forth in claim 10 wherein said mast-like support element between said pair of rotors includes a pivotal support at its lower end about which said frame elements may rotate in effecting the conjoint positioning of said rotors at a selected angle of attack with respect to the apparent wind direction.

12. In windpower energy converting means, a mast-like central support for an upper horizontal and lower horizontal cross beam, each cross beam centrally fixed to said central support, said central support and cross beams forming a frame supporting a pair of rotors, pivotal mounting means for said central support allowing conjoint rotation of said central support and cross beams about the longitudinal axis of said central support an independently rotatable cylindrical rotor disposed on opposite sides of said central support and supported intermediate said upper and lower cross beams, and controllable motor means for driving each of said rotors at a selected speed and rotational direction.

13. The windpower energy converting means as defined in claim 12 including means for directionally rotating and positioning said mast-like support, frame and rotors on said pivotal mounting means.

14. The windpower energy converting means as defined in claim 12, including means for sensing the wind speed and direction of the ambient air about said energy converting means, means for supporting said windpower energy converting assembly upon a transporting means such as a ship, land vehicle or the like responsive to the energy derived from the wind upon said energy converting means and means for conjointly directionally rotating and positioning said central support, frame and rotor with respect to the apparent direction of the wind upon said rotors.

15. The windpower energy converting means as defined in claim 12 including means for directionally rotating and positioning said rotors with respect to the apparent direction of the wind upon said rotors, and wherein said selected speed includes peripheral speeds ranging from about two to four times the velocity of the wind thereon.

16. The windpower converting means as defined in claim 15 wherein the means for rotating said rotors are electrical motors or internal combustion engines mounted to supply the rotary power to each of said rotors.

* * * * *